UNITED STATES PATENT OFFICE.

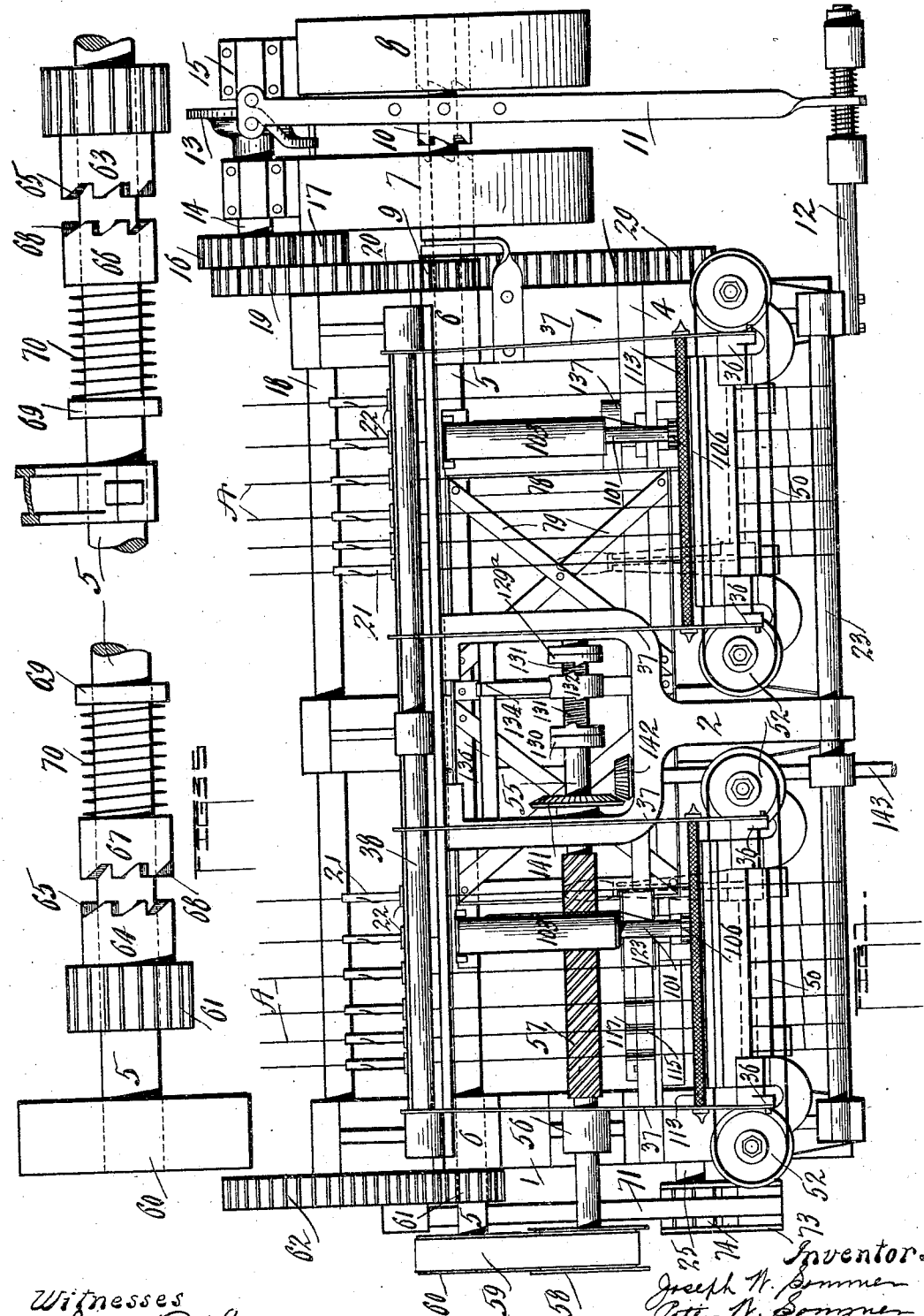

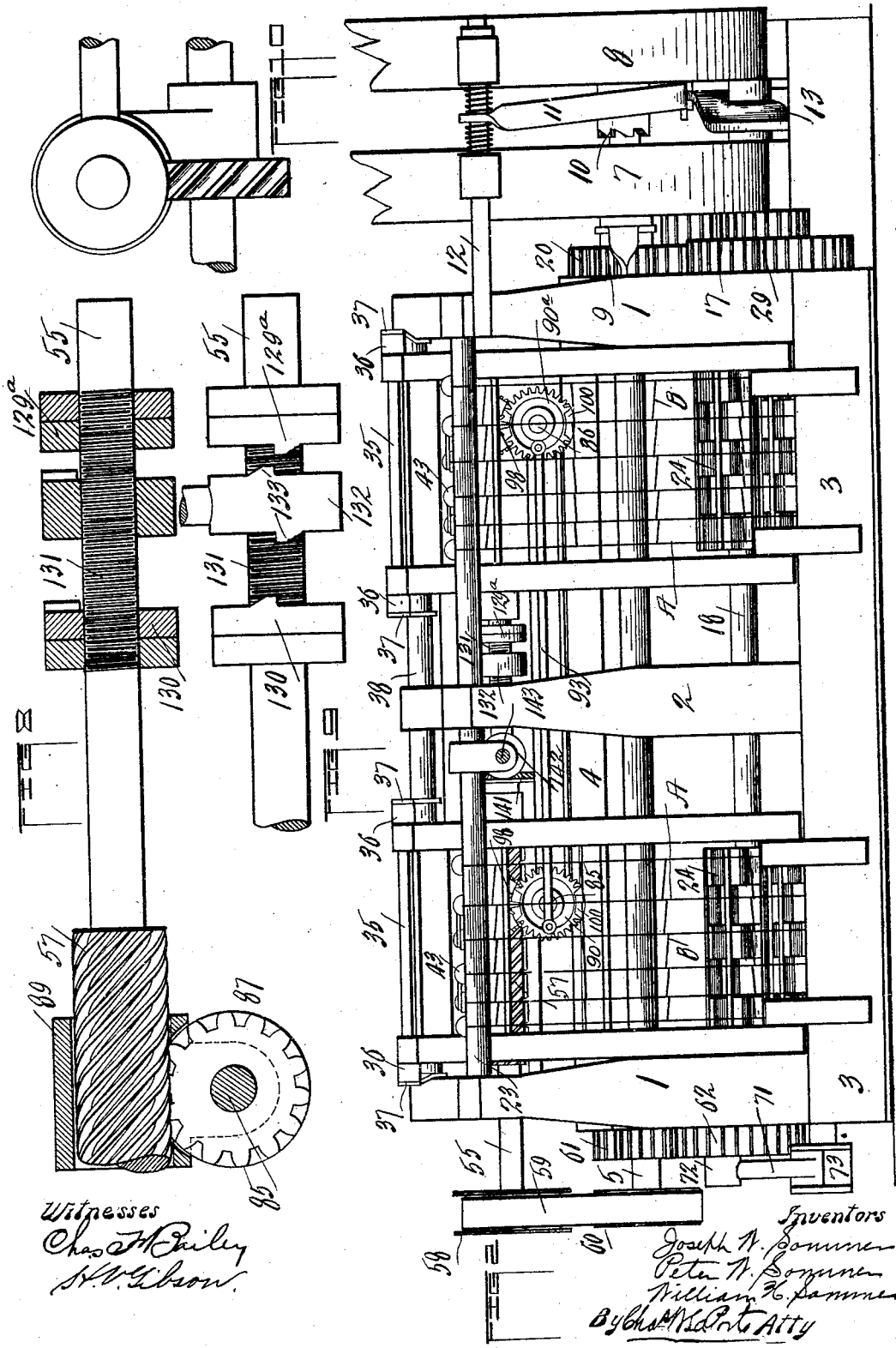

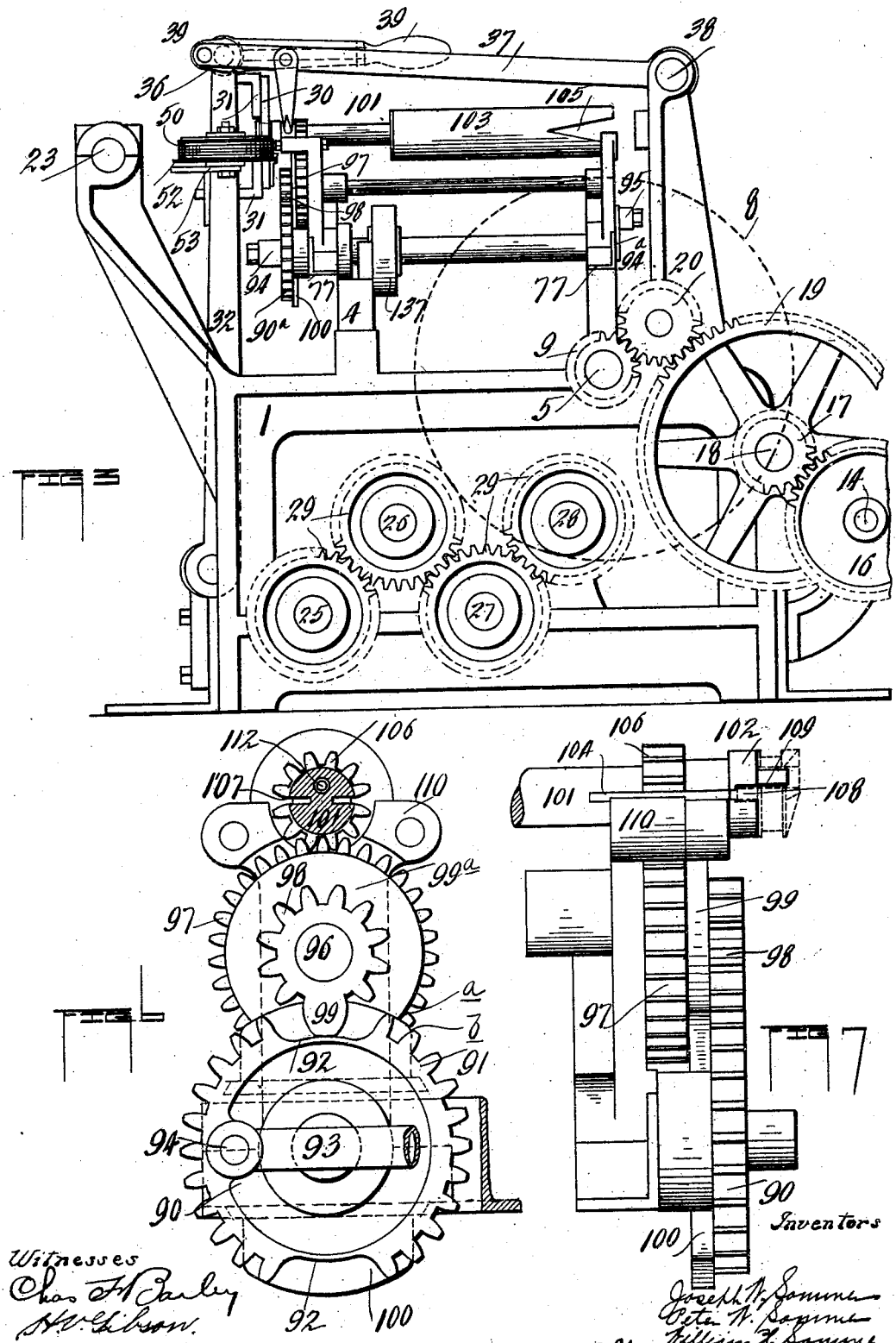

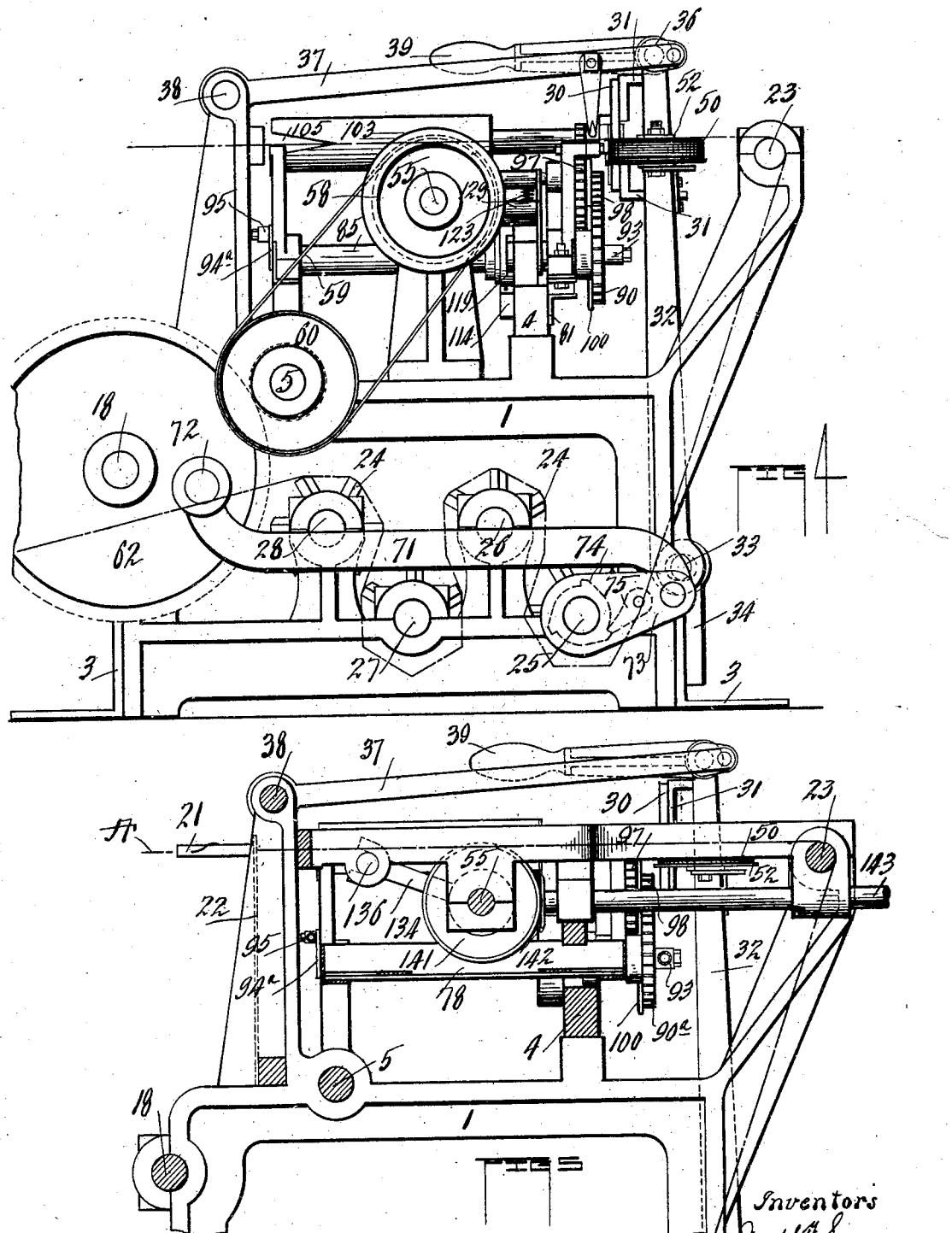

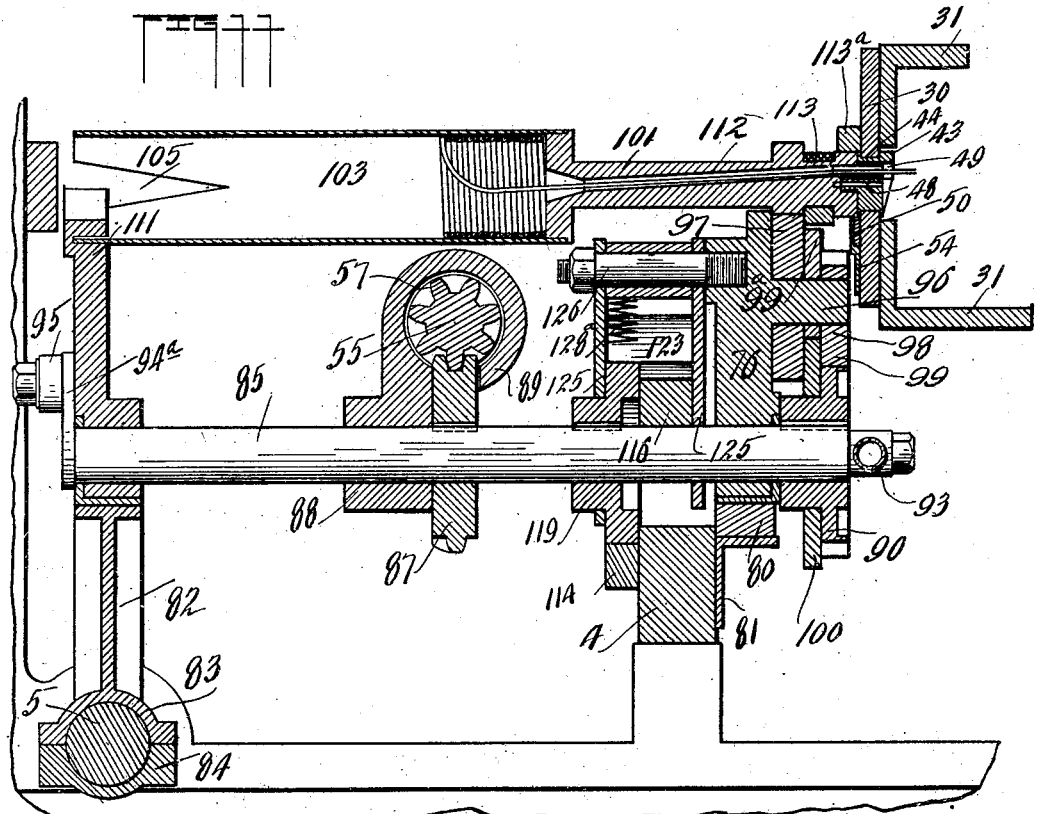
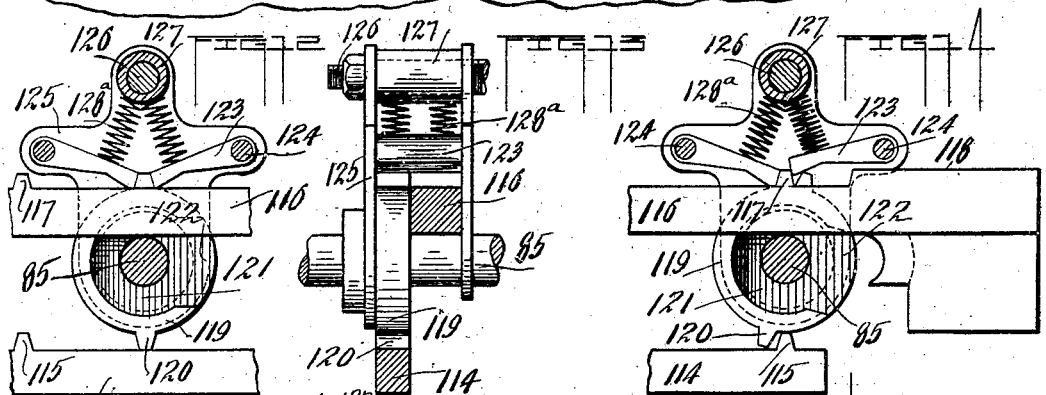

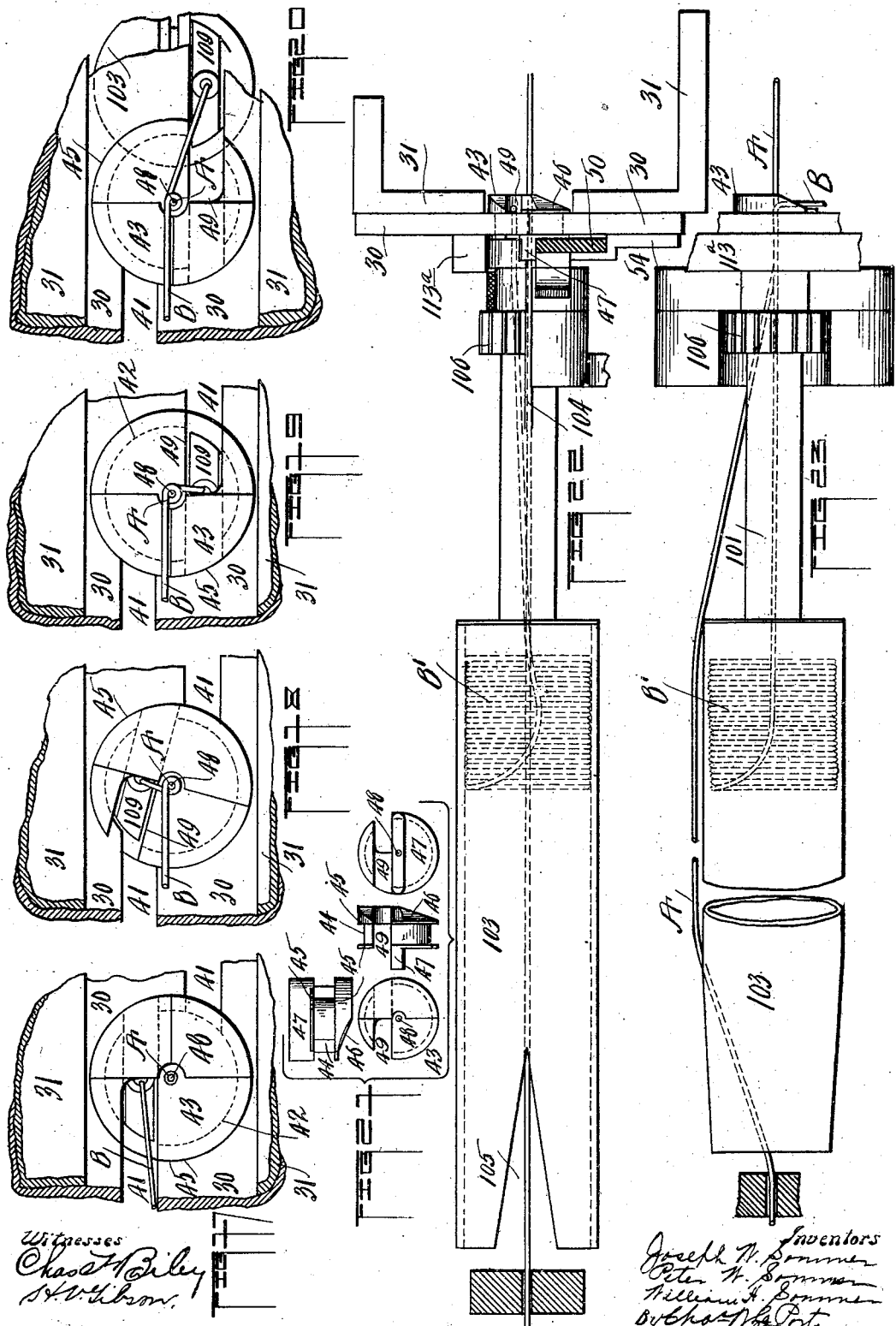

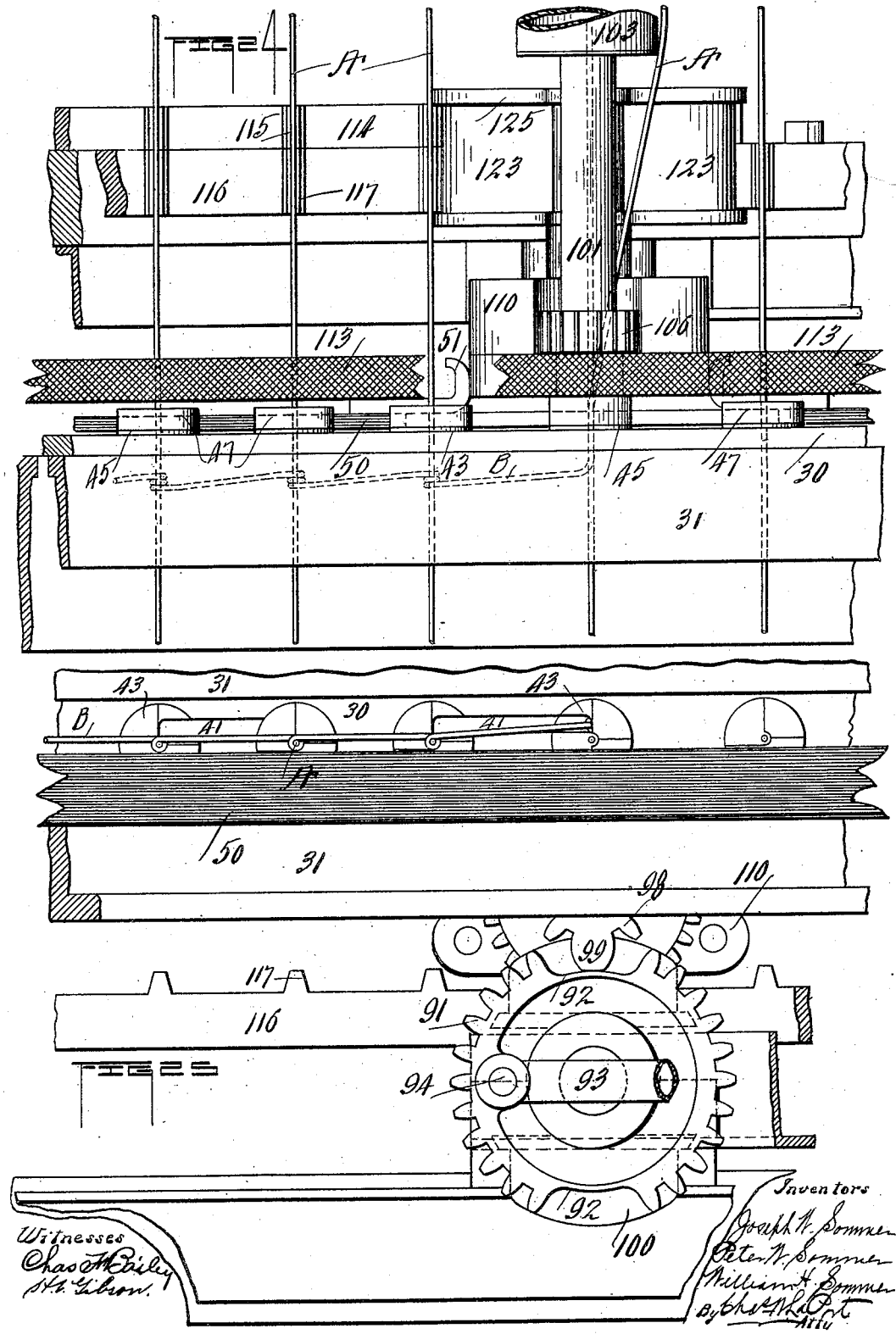

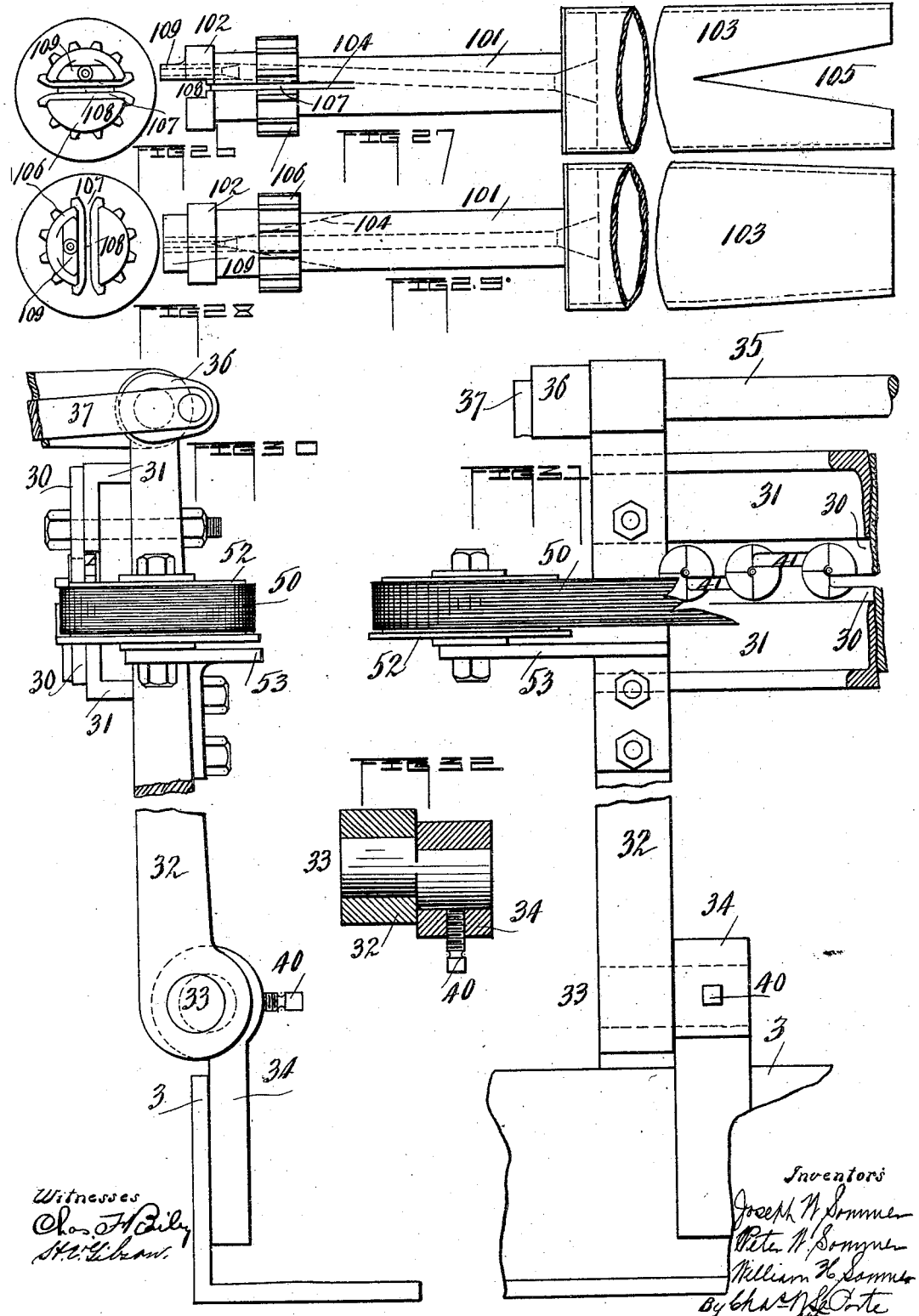

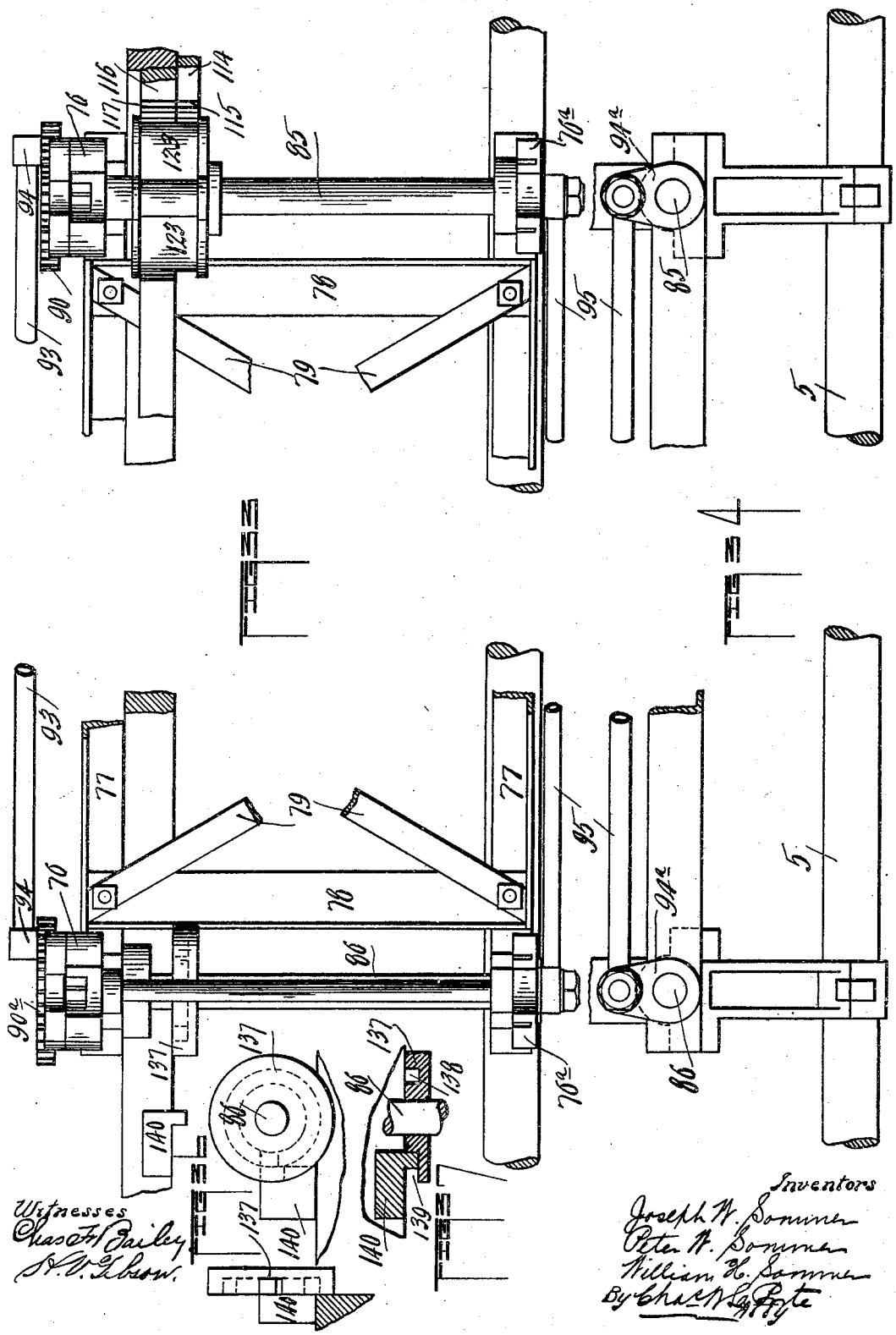

JOSEPH W. SOMMER, PETER W. SOMMER, AND WILLIAM H. SOMMER, OF PEORIA, ILLINOIS, BENJAMIN L. SOMMER EXECUTOR OF JOSEPH W. SOMMER, DECEASED,) ASSIGNORS TO KEYSTONE STEEL & WIRE COMPANY, OF SOUTH BARTONVILLE, ILLINOIS, A CORPORATION OF ILLINOIS.

WIRE-FENCE MACHINE.

937,968.   Specification of Letters Patent.   Patented Oct. 26, 1909.

Application filed October 20, 1904. Serial No. 229,242.

*To all whom it may concern:*

Be it known that we, JOSEPH W. SOMMER, PETER W. SOMMER, and WILLIAM H. SOMMER, citizens of the United States, residing at Peoria, in the county of Peoria and State of Illinois, have invented certain new and useful Improvements in Wire-Fence Machines; and we do hereby declare that the following is a full, clear, and exact description of the invention, which will enable others skilled in the art to which it appertains to make and use the same.

This invention has reference to new and useful improvements in wire fence machines.

It has for its object the manufacture of a fence fabric using running or strand wires and stay wires; the said stay wire being fed across and re-across the running wires, and where the stay intersects the running wires it is intertwisted therewith.

The form of fabric may be seen in Patent No. 414,125, issued to Sommer et al. on October 29, 1889; wherein the stays are formed from a continuous strand of wire, crossing the running wires from selvage wire to selvage wire, and being intertwisted alternately upon opposite sides of the fabric with the selvage wires is redirected across the said running wires; and although the stays are formed from one continuous strand, which is the preferred form, it is not essential, and other forms of fabric and stays may be made with as good results, by a rearrangement of the parts.

The invention has for its further object, a supporting frame; a carriage movable in opposite directions across said frame; one or more series of twisting disks mounted in said frame; one or more revoluble members mounted on said carriage, provided with a spindle having a head adapted to coöperate with the twisting disks, and the said spindle supporting means for carrying a coil of wire adapted to form the stay of the fabric to be manufactured.

A further object of the invention is a bed frame; a carriage movable in opposite directions in said bed; a guide or guides arranged longitudinally in the said bed frame; means for feeding strand wires across the path of the carriage and through the said guide or guides; a wire-coil carrying member or members revolubly mounted on said carriage and having an acting portion movable and revoluble in the guide or guides of the bed.

A further object of the invention is a bed frame; strand wire feeding mechanism; a carriage reciprocally carried on said bed; an elongated screw for actuating said carriage gearing on the carriage coacting with the said screw; clutch mechanism adapted to be automatically actuated for reversing the motion of said screw and thereby reverse the movement of said carriage; and coil carrying members supported by said carriage and intermittingly actuated by the gearing thereof for coiling the wire carried thereby around the successive strands of the fabric as the coil carrying members coincide therewith.

The invention consists further, of a bed frame, a carriage movable across the bed, means for feeding strand wires across the path of the carriage; a stay feeding and coiling member revolubly mounted on said carriage, the said member comprising a spindle, a coiling head and a barrel connected to said spindle and adapted to contain a coil of wire, which forms the stays, and being drawn from the barrel through an opening in the spindle and its head. The movement of the carriage as it traverses its bed causes the barrel and spindle to engage successive strands and by such engagement and during the rotation of the barrel the body of the strand is revolved with the barrel; and simultaneously with such movement, the stay in the barrel is being drawn out through the spindle head and is coiled around the strand.

The invention consists further, of a stationary bed frame; a carriage reciprocally carried in said bed; a frame pivotally mounted in connection with said bed; a series of wire twister members mounted in said frame; wire strands fed across the path of the carriage and through said twisters; an elongated spiral screw for actuating the said carriage, means for actuating the screw and at pre-determined intervals for reversing the same; a coiling member or members revolubly mounted on the carriage, the same having an acting portion adapted to engage and rotate the twister when coincident therewith; means for retaining a coil of wire in said member and feeding the same to be coiled around the strand wires; and wire crimping and pulling out devices adapted to be actuated as the carriage reaches the opposite ends of the bed.

To these ends our invention consists in the features and in the novel construction, combination and arrangement of parts hereinafter described, and particularly pointed out in the claims following the description; and while the essential and characteristic features of our invention are necessarily susceptible of modification, the preferred embodiment thereof is illustrated in the accompanying drawings, in which:—

Figure 1 is a plan view on a reduced scale of our improved wire fabric machine; Fig. 2 is a front elevation of the machine shown in Fig. 1; Fig. 3 is an end view of the machine, as the same appears from one end thereof; Fig. 4 is an end view of the machine as the same appears from the end opposite to Fig. 3; Fig. 5 is a vertical cross section at a suitable point in the bed, to show certain carriage operating parts; Fig. 6 is an elevation enlarged showing certain gearing of the carriage for actuating the stay carrying and coiling device, and Fig. 7 is an edge view thereof; Fig. 8 is a detached view enlarged, of one end of the spiral screw, a gear on the carriage, and clutch parts for locking the said screw against rotation; Fig. 9 is a view in plan of the clutch parts seen in Fig. 8; Fig. 10 is an end view of Fig. 8; Fig. 11 is an elevation in section of a portion of the bed, the carriage, operative parts thereof, the screw for moving the carriage, twister disks through which the strand wires are carried, the stay coiling member, its support and showing the manner of carrying a coil in the said member; Figs. 12, 13, 14, 15 and 16 show in elevation and section, parts of the bed, and movable parts of the carriage for locking the same when the stay carrying devices thereof are coincident with the strand wires; Figs. 17, 18, 19 and 20, show enlarged, and in front elevation, the twister disks, and four different positions of the same during the coiling or intertwisting of the stay wire with the strands; Fig. 21 shows in plan and elevation four different views of the twister disks; Fig. 22 is a detached side elevation enlarged, of the spindle head and barrel carrying the coil to form the stay and parts with which the head of the spindle coöperates; Fig. 23 is a plan of parts seen in Fig. 22, with the barrel broken in two; Fig. 24 is a plan view enlarged, of the frame carrying the twister heads and the twister heads, parts of the carriage and stay feeding and coiling devices. The view also shows the form of fabric as it is made; Fig. 25 is a front elevation of parts seen in Fig. 24; Figs. 26, 27, 28 and 29 show the stay carrying and coiling member in four different positions; Fig. 30 is a detached view enlarged, of the frame which supports the twister disks, and the manner of pivoting the frame to the bed frame; Fig. 31 is a front elevation of parts seen in Fig. 30; Fig. 32 is a detached sectional view of the pivotal parts between the pivoted frame supporting the disks, and the main frame; Fig. 33 is a plan view of the carriage and parts of the bed, the carriage broken in two; Fig. 34 is a rear elevation of the carriage as illustrated in Fig. 33; Fig. 35 is a plan view of the main driving shaft, and clutch parts thereof to facilitate in the reversing of such shaft; Fig. 36 shows in detail, two views in opposite elevation of a member carried by the carriage and coacting parts of the main frame, adapted to lock the position of said carriage at predetermined intervals, and Fig. 37 is a sectional view of the member shown in Fig. 36, and a part of the bed with which the same has a locking relation.

Like numerals of reference refer to corresponding parts throughout the figures.

The working parts of the machine are mounted on a stationary bed or main frame, composed of the uprights 1 and 2, the sills 3 and frame connections 4.

5 denotes a main driving shaft which serves as a support for a carriage to be described, the same journaled in a suitable manner to the frame supports, and on one end of the said shaft is loosely carried the oppositely driven pulleys 7 and 8, and also a pinion 9. The pulleys 7 and 8 are alternately made fast to the shaft 5 by means of a clutch part 10 feathered on the shaft 5. The shifting of the clutch part 10 is performed automatically and at the time the carriage reaches the opposite end of the bed on which it travels. The means for shifting the clutch part 10 is through a clutch operating lever 11; one end having suitable connection with a rod 12 supported by the main frame of the machine, and the opposite end thereof is in operative engagement with a cam 13 carried by a shaft 14 journaled in boxings 15 suitably supported. The body of the lever having a fixed connection with the clutch part 10, as seen in Fig. 1.

On the cam shaft 14 is carried a gear wheel 16, the same intermeshing with a gear wheel 17 carried by a shaft 18. The shaft 18 extends longitudinally of the machine and upon its opposite end carries parts to be hereinafter described as operating the pullout mechanism. On the shaft 18 adjacent to the gear wheel 17 is carried a somewhat larger gear wheel 19, which meshes with an idler-gear-wheel 20, and it in turn meshes with the pinion 9 above described. The idler-gear-wheel 20 is employed for the purpose of imparting the proper rotation to the shaft 18, so as to properly regulate the pullout mechanism to be described. It will thus be seen that the rotation of the cam 13 will automatically and alternately shift the lever 11 and the clutch part 10 in opposite directions, and by the engagement of the clutch part with corresponding clutch faces of the pulleys 7 and 8 the shaft 5 will be correspondingly rotated in opposite directions. It will be further described how the shaft 5 controls the movement of the carriage and its parts, and the reversal of the said shaft at the time the carriage reaches the opposite ends of the bed.

The strand wires of the fabric which will be indicated as A, are fed from suitable reels or spools (not shown) through tubes or guides 21 supported by the spring arms 22, which are fast at their lower ends and free to move back and forth at their upper ends. The function of which will be hereinafter more clearly brought out. The wires A are carried across the bed of the machine and the path of the carriage, through a guide or guides, over a bar 23 forming a part of the main frame and to and around a series of pulling-out and crimping rollers 24 carried by the shafts 25, 26, 27 and 28, each of which is provided on one end with the intermeshing gears 29, and the said shafts operated at predetermined intervals by the shaft 18 in a manner to be described; and from the pulling-out rollers the then finished fabric is directed to and around a suitable reeling or wrapping device (not shown).

The guide or guides above mentioned through which the strand wires A are carried or directed, comprises one or more pairs of plates or bars 30, which are connected at their opposite ends to the angle bars 31, which extend parallel with the plates 30 and separated to leave a longitudinal open-way between them. The angle bars 31 at their opposite ends are supported by or attached to standards or uprights 32 which, at their lower ends are pivoted eccentrically as at 33 to supports 34 of the sills 3 of the main frame. Connection is had between the upper end of the standards 32 through connecting rods or bars 35. And supporting the upper ends of the standards 32, to retain their relative positions with other parts of the machine, is a short arm or crank 36 on the outer end of the rods 35, to which are attached the connecting bars 37, which at their opposite ends are coupled to a bar 38 forming one of the main frame connections. It is adapted, for reasons to be more fully explained, to swing or oscillate the standards 32 on their pivots. This we accomplish by means of the hand levers 39 attached to the rods 35, so that when the levers are swung in the proper direction the rods 35 will rotate in their bearings throwing the cranks 36 around and causing the standards 32 to be swung outwardly. To return the standards to their normal positions, the movements of the lever or levers would be reversed. The outward or inward movement of the standards will carry with them the angle bars 31, the bars 30 and other parts, as is apparent. It is to be further noted that the angle or distance at which the standards 32 may be swung is regulated by changing the position of the pivot 33, and retaining the same so adjusted by means of the set screws 40.

The plates or bars 30 have irregular matching edges, which, when placed as shown in the figures, form a sinuous passage, guide-way or groove 41, and at intervals the edges of the plates are provided with matching and substantially semi-circular portions 42, forming seats for twister-disks 43. These twister disks are more clearly seen in Fig. 21, where a plan, two opposite elevations and an edge view are shown. Each disk is formed of a body having an annular groove 44 which is adapted to fit in the seats 42 of the plate 30 when they are placed in position, the opposite walls or flanges 45 forming the grooves of the disks engaging or lying adjacent to the opposite face of the plates 30. Each disk is further provided with a front beveled face 46 and a lug or plate extension 47 from the opposite face thereof, and through the center of the disk and its lug is provided a wire groove or opening 48. And each disk is further provided with a slotted opening 49 extending into the body thereof, the same extending entirely through the same to the extent of half the disk, and only partly through the other half. The function of the opening 49 will be more fully explained in connection with a coiling head to be described.

In the drawings the twister disks are placed at graduated distances apart, the placing of which it is apparent will provide for a fabric having graduated meshes. This necessitates a corresponding arrangement of the seats 42 in the plates 30, but this is not material, and the twister disks may be placed at uniform distances apart if it is so desired.

In the operation of the machine after the actuation of each twister disk 43, as will be more fully explained, it is necessary to leave the disks in position so that their slots 49 are in line with the grooves, guides or passage-ways 41, and to accomplish this, we have provided a guiding and retaining traveler or belt 50, its opposite ends attached to suitable cleats or brackets 51, see Fig. 24, which are adapted to be moved in opposite directions through the actuation of a carriage and its parts to be described.

The belt or traveler is carried around flanged rollers or sheave wheels 52 stationed at the opposite ends of the machine and supported by brackets 53 attached to the standards 32 of the swingable frame described. The body of the belt lies adjacent to the lower plate 30 and the upper edge thereof travels beneath and adjacent to the lower face of the lugs 47 of the disks 43. Where the twister or coiling devices operate to coil a stay wire around the strand wires which pass through the disks 43 the belt or traveler is omitted, but after the coiling devices move away from the disks the traveler or belt 50 follows in the path of the coilers and beneath the lugs 47 of the disks retaining them in their proper positions until the coiler again coincides therewith. To guide and support the body of the belt to adapt the upper edge thereof to engage the lower face of the lugs 47 of the disks, we have provided a shelf or run-way 54 attached to the inner face of the lower plate 30, in which the belt travels, see Fig. 22.

55 indicates a stem, supported longitudinally within the bed of the machine, its inner end journaled in the frame support 2 and its outer end journaled in and carried through a boxing 56, supported by the frame 1, see Fig. 1. And that portion of the stem between the frames 1 and 2 is provided with a spiral screw portion 57. On the extreme outer end of the stem 55 is carried a flanged pulley 58 around which a belt 59 is carried which also travels around and receives its power from a pulley 60 carried on the main driving shaft 5. There is carried by the shaft 5 between the boxing 6 and the pulley 60 a gear 61, being similar to the gear 9 upon the opposite end of the shaft, this gear intermeshes with a gear wheel 62 on the shaft 18, similar to the gear wheel 19 on the opposite end of the shaft 18. The shaft 18 is known as the pull-out shaft, for the reason, that by its operation the pulling-out and crimping rollers 24 are actuated. This is accomplished as follows:—The gears 9 and 61 are both loose on the shaft 5, and each has sleeves 63 and 64 formed integral with the gears and provided with the inner clutch faces 65, disposed within the interior of the boxings 6. On the shaft 5 and operating within the boxings 6, is shown the sleeves 66 and 67, which are feathered on said shaft and provided with clutch faces 68 adapted to have engagement with the clutch faces of the sleeves 63 and 64 for making the pinions or gears 9 and 61 fast with said shaft. There is also carried by the shaft 5 collars or disks 69 and between the said collars and the sleeves 66 and 67 are carried coil springs 70.

The carriage which will be hereinafter described, is provided with a member slidable on the shaft 5, adapted when it reaches the opposite ends of its movement, to engage with the collars or disks 69 which yieldingly cause the sleeves 66 and 67 to clutch the sleeves 63 and 64 for clutching the gears 9 and 61 with the shaft 5, and thereby impart movement to the shaft 18 through either of the gears 19 or 62, and by such movement the gears 16 and 17 are actuated to shift the cam 13 which governs the direction of rotation of the shaft 5 through the pulleys 7 and 8, as has been described. In other words, when the carriage traverses to the left of its bed, looking at Fig. 1, the gear 61 is thrown into mesh for actuating the shaft 18, through the gear 62; and when the carriage traverses to the right, the gear 9 is actuated to rotate the shaft 18 through the gear 19, as described. The springs 70 provide for gradually clutching the sleeves 63, 64, 66 and 67 during the movement of the carriage and insures the clutch faces of the sleeves engaging without breaking. The rotation of the shaft 5 being alternately in opposite directions, the clutch parts not in motion will ride away from each other so as not to interfere, as is apparent.

When the shaft 18 is rotated, movement will be imparted to the pulling-out and crimping rollers 24 by means of a pitman bar or connecting rod 71 pivotally connected at 72 to the gear 62 and its opposite end pivotally connected to a crank-arm 73 on the shaft 25. The shaft 25 carries a ratchet gear 74 adapted to be engaged by a pawl 75, see Fig. 4. It will thus be seen that during a partial rotation of the gear 62 the pitman 71 will be drawn forward and upon its return the pawl 75 will, by engagement with the teeth of the ratchet gear 74 impart a partial rotation to the shaft 25 and from the shaft 25 to the shafts 26, 27 and 28, through the intermeshing gears 29.

The carriage to which attention has heretofore been called, will now be described. The same consists of four bearings, standards or supports 76, and 76ª, connected by the longitudinal frames 77, the transverse braces 78, and the diagonal braces 79. The front run of the carriage has connected to the lower face of the frame 77, a bar 80 of suitable length slidable on the rest or frame 81 connected to the frame part 4 of the bed. To the rear frame 77 and beneath the bearing or standards 76ª, are connected supports 82, the lower ends of which are formed into half-boxings 83, and together with matching half-boxings 84 engage and are slidably carried on the main driving shaft 5, see Fig. 11.

Disposed transversely at the ends of the carriage and journaled in the lower portions of the opposite bearings or standards are shown shafts 85 and 86. It is provided that the shafts 85 and 86 receive their power from the spindle or stem 55 through the spirally threaded portion thereof. On the shaft 85 is carried a gear wheel 87, the toothed periphery thereof conforming to the spiral screw 57 of the stem 55, and intermeshing therewith, the said gear 87 being fixed to the shaft 85; and 88 denotes a housing supported by the shaft 85, the stem 55 and its screw passing through a tubular portion 89 of the housing, as does also the gear 87, see Fig. 11. On the front end of the shafts 85 and 86 is carried the segment toothed gear wheels 90 and 90ª, having the toothed portions 91 and the cam surfaces 92. The gears 90 and 90ª, are connected by the connecting rod 93 having a pivotal connection at 94 with each of said gears. The rod 93 forming a driving connection between the gears 90 and 90ª for the purpose of transmitting motion from the shaft 85 to the shaft 86. This is supplemented by means of the crank-arms 94ª on the rear ends of the shafts 85 and 86 to which are pivotally attached the opposite ends of a connecting rod 95. The connection of the rod 93 and 95 with the gears and cranks on the shafts 85 and 86 is such that should either of the rods become centered and thereby locking, the opposing rod would serve to communicate the power, and for this reason the opposing rods 93 and 95 are employed.

The forward bearing or standards 76 are provided with the laterally extended stems or studs 96 on which it is adapted to carry the gear 97 and the pinion 98, the latter provided with an enlarged tooth 99. The tooth 99 is adapted to intermittingly and alternately coincide and ride on the cam surfaces 92 of the gears 90 and 90ª, while the remaining toothed portions coact with the tooth portions 91 of the said gears 90 and 90ª. The gear 97 and the pinion 98 are separated by a cam disk 99 carried by the studs 96, the same having a coacting relation with a cam disk 100 carried by the gears 90 and 90ª. It is arranged through the shafts 85 and 86 and connections described, together with the gears and pinions 97 and 98 to intermittingly and alternately actuate a pair of coil carrying and coiling members. These members comprise the spindle portions 101, having the heads 102, and the rear ends of the spindles terminate into the coil carrying barrels 103, in diameter somewhat larger than the body of their spindles 101. The opposite walls of the forward portions of the spindles 101, are slotted or grooved as at 104 from the heads 102 back a suitable distance, for a purpose which will be described, and the opposite walls of the rear ends of the barrels 103 have V shaped slotted portions 105 for a suitable length, the purpose of which will also be further described. The spindle portion 101 of the coiling members is provided with a slotted pinion 106, the pinion slotted upon opposite sides as at 107 to correspond to the groove 104 in the spindle 101. The spindle head 102 is provided with a slotted seat portion 108 and a projection or lug 100 extending forwardly from the face of the head and to one side of its center, see Figs. 26 and 29.

The manner of supporting the spindle and barrel on the carriage proper, is to journal that portion of the spindle to the rear of the head, in the bearing 110 at the upper ends of the standards 76, the bearings, or that portion of the standards 76 adjacent to the bearings 110 being large enough and grooved so as to partially incase the pinion 106, see Figs. 6 and 7; and the rear end of the barrel 103 is rotatable in a bearing 111 forming a part of the standards 76ª.

In working position the spindle heads of the coilers are moved longitudinally through the machine and caused to successively engage the series of twisting disks 43, the said disks being disposed with their slots 49 and the lugs 47 extending longitudinally of the machine; as the head 102 coincides with each disk, the lug 109 of the head 102 will enter the slot 49 of the disk, and the lug 47 of the disk will enter the slot 108 of the head 102, forming a locking connection between head and disk, when the same will be rotated until the coiling of a stay wire around a strand is completed, when the head 102 and disk 43 will assume a position similar to that before they became interlocked, and the coiling spindle and head will be moved to the next adjoining disk.

The strand wires A, to which attention has been previously called, are fed through the guides 21 in line with the axis of the spindle 101 and the barrels 103, across the path of the movement of the said coiling spindles and through the wire grooves 48 in the twister disks 43, over a guide 23 to and around the crimping and pulling-out rollers 24 and to suitable wrapping devices, not shown.

The stay wires which will be referred to as B are fed from coils B' which have been previously formed from wire and placed in the barrels 103 of the spindles 101, see Figs. 11, 22 and 23. One end of the coil forming the stay wire B is passed through a wire groove or opening 112 extending diagonally and longitudinally through the spindle 101 and out through the head 102 and the lug 109; the opening of the wire groove 112 in the lug 109 being eccentric to the center of its axis and the path of the strand wires A through their heads 43.

The correlative arrangement of the coilers and the disks 43 may be clearly seen in Figs. 17, 18, 19, 20, 22, 23, 24, and 25, and particularly in Figs. 17, 18, 19, and 20, wherein the head 102 of the coilers and the disks are shown to illustrate the different steps in the operation of coiling a stay wire B around the adjacent strands A, from the time the head 102 of the coiler enters a disk 43 until the coil of the stay is made and the coiler moves to the next succeeding disk and its strand. In Fig. 24 there is shown in dotted lines a partially completed stay and the position of the wires just previous to directing the stay wire around the strand. The eccentric disposition of the stay wire B passing through the wire groove 112 in the lug 109 of the coiler insures the same being carried around the strand in the movement of the coiler and disks when they are interlocked.

In the carrying of the strand wires A across the bed in the path of the coiling spindles and barrels, as the carriage is reciprocated, the barrels 103 of the spindles 101, will engage with the strand wires A and the said wires will lie in the groove or slot 105 of the barrel, along the body of the barrel 103 and in the groove of the spindle 101, and in doing so draw the strands slightly forward and the spring arms 22 supporting the guides 21, so that when the barrel of the spindles moves away from the strands the spring arms 22 will move back into their normal positions as seen in Fig. 5, drawing the strand wire with them. The strands are so passed through the guides that they are frictionally held, permitting slack in the wires when engaged by the barrels by the giving of the spring arms, see Figs. 22 and 23, illustrating the carrying of the strands; thus it will be seen that as the barrel or spindles are rotated to coil a stay, the strand wire engaging the barrel, the groove or slot 105 and the groove of the spindle, that the same will be revolved with the said spindle and barrel; when stopping, the barrel and spindle will leave the strand in its original position, but upon the opposite side to permit the barrel to be moved to the adjacent strands, all of which it is believed will be understood.

We have provided a lubricating wick or wicks 113 suitably secured at their opposite ends to the arms 37. The body of the wick lies above that portion of the spindles 101 between the head 102 and the gear or pinion 107, for the purpose of lubricating the same and its bearing 110. Attention is here called to a covering bar or plate 113ª, attached to and extending parallel with the upper plate 30, the function of which is to act as a bearing for the forward end of the spindle 101 and its head 102 to prevent the same from rising or becoming dislodged during the operation of coiling or moving with the carriage; the bar is best seen in Figs. 11, 22 and 23.

The construction of the machine, provides for the making of two rolls of fabric at one operation of the carriage and its parts, as will be seen from the figures, and especially Figs. 1 and 2, and while reference at times has been made to devices singly, which are duplicated either upon the carriage or the bed of the machine, it is understood that no limitation is made by such description, as the machine may be made with substantially the parts described to produce one roll or two as shown.

While we have described a series of disks, such as 43 and indicate them as twisting disks, employed to coöperate with the coiling members, attention is here called to the reason for employing such disks, and to show while they serve as useful function it is not altogether necessary that they be used.

In the operation of coiling a stay wire B around the several strand wires A to connect the same, the use of the coiling members as herein shown would alone accomplish this end without the use of the disks 43, as the strands would be fed as herein, and the coilers as now intended, would have an intermittent movement across the bed and as they coincided with the strands would coil a part of the stay there-around. There is the danger however that the wires might pull out of line and to some extent destroy the design of the fence, as well as some of its other qualities, and therefore a means has been devised to retain the strands in the position in which they are fed both before and after the twisting of a stay therewith, and this means consists of the disks 43, described. The plates 30 serving as bearings for the disks and providing grooves for the passage of the stay wires as they are carried from disk to disk and back again. It being understood that after a stay has been carried from one selvage wire to the other, the former fabric is drawn out a desirable distance, and during such drawing out of the fabric, the stay wire is intertwisted or wrapped around the selvage wire, and the stay carried back across the strands, being wrapped around each succeeding strand and with the opposite selvage wire in manner as before, and the process so continued until sufficient fabric has been formed.

Referring again to the frame supports 32 which have an oscillatory connection with the main frame; when it is desired to replace a coiling member or to replenish one with a coil, to detach the same from the carriage, the lever 39 is swung throwing the frames 32 with the plates 30, the bar 113ª, the twister disks 43 and other connections outwardly, and although not disturbing the wicks 113 to any great extent, the coiling members, free from all obstructions may be removed from their bearings and others inserted or the same replaced, the reversing of the lever 39 readjusting the parts described, as before.

In the movement of the carriage across the bed to bring the coiling members coincident with each of the strand wires, to stop and retain the carriage in a fixed position for a pre-determined period until the twisting of the stay with the strand is completed and to hold the carriage during the pulling out of the fabric after each movement of the carriage across the bed, we have provided mechanism supported by the carriage adapted to have a coacting relation with parts of the bed for holding the carriage during the interval of twisting of the stay with the strands, and when the said carriage has reached the end of the bed and during the process of pulling out a section of the completed fabric. These devices comprise a longitudinally arranged bar 114 supported upon or attached to the inner face of the frame part 4, and the said bar is provided with a series of upwardly extending lugs or teeth 115 spaced at graduated distances apart, the distance between the lugs conforming to the distance between the centers of the disks 43. There is further provided a bar 116 somewhat similar to that shown at 114 suitably supported at its ends and crossing the shafts 85 and 86, and it is provided with a series of upwardly extended lugs or teeth 117 suitably disposed and spaced at graduated distances apart, the said bar being further provided with the raised end portions 118 serving a function similar to the lugs or teeth 117.

On the shaft 85 there is fixedly carried a disk 119, provided with two oppositely projected teeth or lugs 120 from the periphery of the said disk. The disk is placed on the shaft to rotate above the bar 114 and adapted to have the teeth or lugs 120 thereof engage with the lugs 115 of the bar 114. The disk 119 is of such a diameter and so positioned that the lugs or teeth 120 thereof extend up above the edge of the bar 116 while the body of the disk rotates in juxtaposition to the face of the said bar. The disk is further provided with a recessed face 121 and an open slotted portion 122 leading to the recess from the periphery of the said disk.

Coacting with the lugs or teeth of the bar 116 and the disk 119 is a pair of oppositely pivoted dogs 123, the same being pivoted at 124 to the supports 125 forming an inclosure for the dogs. The supports 125 are connected at their upper ends by a rod 126 passing through the supports and a sleeve 127 separating the supports, and screwed into the bearing or standard 76, the lower ends of the supports suitably carried by the shaft 85. It is arranged to have the approaching ends of the dogs separated from each other approximately the thickness of a tooth 117 of the bar 116 and yieldingly held against the bar 116 or the disk 119 by means of the springs 128$^a$ bearing between the dogs and the sleeve 127, see Figs. 12–15.

In Figs. 6 and 12 the gearing for rotating the coiling spindles, and the dogs 123 and the disk 119 are shown in the position when the carriage is moving, that is, moving the coiling members from one strand wire or from one disk 43 to the next. In this position the shaft 85 has rotated into such a position as to cause one of the teeth of the disk 119 to be locked between the ends of the opposing dogs 123, which will prevent the actuation of the gear 87 of the shaft 85 by the spiral screw 57, thus causing the gear 87 to travel along the screw, and consequently the carriage is moved until the disk 119 is released. The locking of the disk 119 places the gearing in Fig. 6 as shown, and locks the position of the cam plates 99 and 100 and insures the pinion 98 and the pinion 106 of the spindle 101 remaining in such a position that the groove 104 of the spindle and the slot 105 of the barrel will engage with succeeding strands A, when coincident therewith.

As the coiling spindles coincide with a strand wire A, the forward dog 123 (according in which direction the carriage is traveling) engages with a lug 117 of the bar 116, and riding up and over the same releases the disk 119; simultaneous with the raising of the dog 123 and the release of the disk 119, the lower lug or tooth 120 thereof engages with a tooth 115 of the bar 114 imparting a partial rotation to the shaft 85 and through connections therewith, the shaft 86. The partial rotation of the shaft 85 moves the gear 90, as also the cam disk 100, into position where the edge $a$ of the cam disk 99 will ride over the corner $b$ of the cam disk 100, and placing the teeth of the gear 90 and the pinion 98 into proper mesh, when rotation will be communicated to the pinion 106 through the gear 97 for properly actuating the coiling spindles. The gear 90 is timed to make a half revolution which is sufficient to properly coil a stay wire around a strand wire, when the gearing in Fig. 6 will again assume the position shown, and the disk assume the position shown in Fig. 12. The half revolution of the gear 90 is accomplished by the disk revolving until the lower tooth 120 moves into position to raise the dog 123, opposite to the one just previously described which engaged with the tooth of the bar 116 after the raising of the opposite dog to release the disk 119, the engaging of the dog and the tooth 117 locking the position of the carriage during the rotating of the coiling members through the actuation of the gear 87 and the shaft 85 through the action of the spiral screw 57; when the tooth 120 will engage with the end of the first mentioned dog, allowing the last mentioned dog to drop and lock the position of the disk 119, as shown in Fig. 12. The steps in the operation of the carriage and its coiling members, as above described, are carried out successively between the intermediate wires and as the coiling members coincide therewith.

It being necessary to insure that the grooves 104 of the coiling spindles and the slots 105 of the barrels be in position to properly engage each successive strand wire A, to accomplish this, the cam plates 99 and 100 are provided, for as the matching faces of the opposing cams interlock as shown in Fig. 6, it is impossible for the pinion 98 to move until the end $a$ of the plate 99 passes over the end $b$ of the plate 100.

In Fig. 14 the disk 119 and dogs 123 are shown in a position just as the coiling members coincide with the strand A adjacent to the selvage wire, or this figure may be used to illustrate the same parts, as the coiling members coincide with any of the intermediate strand wires, as above described; when the disk 119 has made its half revolution, during which time the coiling is in process, and releases the dog 123 then engaging the lug 117 of the bar 116, the disk 119 has assumed a position with the slotted portion 122 lying in a horizontal line facing a lug or stop 128 attached to or integral with a frame part 129; as the carriage moves forward, the disk 119 and the shaft 85 being in a locked position, the lug or stop 128 enters the slot 122 of the disk and becomes seated in the recess 121, as seen in Figs. 15 and 16, and simultaneous with the seating of the stop 128, the forward dog 123 rides up onto the raised end 118 of the bar 116, releasing the disk which will be rotated in the manner described. The opposite dog 123 engages with the end or off-set of the raised portion 118, as seen in Fig. 14 stopping the movement of the carriage allowing the shaft 85 and disk to be rotated a sufficient number of times for the purpose of pulling out the fabric and intertwisting or coiling the stay with the selvage wire a predetermined distance. After a sufficient number of turns has been imparted to the shaft 85 and disk 119, devices are brought into play to lock the rotation of the shaft 85 and 86 and the driving screw 87, when the power shaft 5 is reversed in the manner hereinbefore described, and the carriage caused to be reciprocated in a reverse direction in the bed, the locking devices, gearing and coiling members repeating the operations above described.

To lock the coiling members, the disk 119 and the connecting gears, after the pulling out of the fabric and during the reversing of the shaft 5, we have provided the clutch members 129$^a$ and 130 on the inner end of the spindle 55; also threading the spindle as at 131 and engaging said threaded portion 131 of the spindle is a threaded member 132 having opposite clutch faces 133 adapted to engage and interlock with the clutch members 129$^a$ and 130, alternately. The member 132 is provided with an extension or arm 134 having a V-shaped end or bifurcated ends as at 135 slidable along on a rod 136 secured in the bed frame. The rotation of the stem 55 shifts the member 132 through the threaded connection therewith, the same being locked from rotating on the stem by the engagement of the extension 134 and the rod 136, and simultaneous with the completion of the wrapping of the stay with the selvage wire and the pulling out of the fabric, one of the clutch faces of the member 132 engages with one of the members 129$^a$ or 130 which locks the rotation of the spindle 55 and its spiral screw 57, the clutches of the driving shaft are properly actuated by the member 82 of the carriage, the cam 13 caused to operate the parts for reversing the driving shaft 5 and through it, the stem 55 is reversed, the belt 59 slipping on the pulley 58 as is apparent.

In Figs. 36 and 37 is shown a disk 137 somewhat similar to the disk 119, but minus any teeth. It is carried by the shaft 86, and adapted when that end of the carriage, when it is moving forward, reaches the end of its movement, to serve the same function as the disk 119. It is provided with a recess 138 and a slot 139 leading to the recess from the periphery of the disk, adapted to be engaged by and interlocked with a lug 140 attached to the bed, in manner similar to the lug or stop 128.

For the purpose of moving the carriage in either direction by hand, after first shutting off the power, we have provided a bevel gear 141 on the spindle 55, and a bevel pinion 142 carried on a slidably arranged spindle 143, to which it is arranged to attach a crank or operator's handle. It will be understood by throwing the gears 141 and 142 into mesh, an operator by the use of a lever attached to the spindle 143 might easily move the carriage through the action of the stem 55. When using power the gears just described are thrown out of mesh.

Having thus fully described our invention, what we claim and desire to secure by Letters Patent of the United States is:—

1. A wire fence machine, comprising a stationary bed frame, a frame pivotally attached to said bed frame, a guide supported by said pivoted frame, a carriage, a coiling member mounted on said carriage, a wire coil support on said member, the said member having a portion movable in the guide aforesaid, means for feeding strand wires across said bed and through the guide, means for actuating the carriage, means for stopping the carriage at intervals in its travel, and means acting simultaneously with the stopping of the carriage to actuate the said coiling member.

2. A wire fence machine, comprising a bed frame, a frame pivotally attached to the bed frame, a guide supported by said pivoted frame, revoluble twister disks supported by said guide, a carriage reciprocally mounted on the bed, a coiling member revolubly supported on the carriage, the same having a head portion adapted to successively engage the twister disks, means for feeding strands of wire across said bed and through the disks aforesaid, a wire coil carried by the coiling member adapted to be coiled around the adjacent strands to connect the same, means for moving the carriage, means for stopping the carriage at intervals, and means acting simultaneously with the stopping of the carriage to actuate the said coiling member.

3. A wire fence machine, comprising a bed frame, a frame pivotally attached to the bed, disks revolubly mounted on said pivoted frame, a coiling member shiftably carried on said bed and provided with a head adapted to successively engage and interlock with the said disks, means for rotating the coiling members when engaging the disks, means for intermittingly shifting the said member, and retaining means adapted to hold the disks in a normal or engaging position as the coiling member leaves the same.

4. A wire fence machine, comprising a bed frame, a support pivotally attached to said bed frame, disks revolubly mounted on said pivoted support, each disk provided with a central wire opening and a slot, a carrier movably mounted on said bed, means for feeding a series of strand wires across the path of the carrier and through the openings in the disks, coiling members revolubly mounted on said carrier adapted to coincide with the disk and having a head adapted to the slot of the disks to accomplish an interlocking relation therewith, means for feeding a stay wire through the coiling members, means for shifting the carrier, and means for rotating the coilers when interlocked with the disks.

5. A wire fence machine, comprising a bed frame, a series of twister disks mounted in said frame, each provided with a slot and a wire opening, and the frame having an open-way guide with which the slots of the disks communicate, means for feeding wire strands through the said disks, a coiling member reciprocally mounted in the bed frame, the same provided with a head adapted to have suitable connection with the slots of the disks and further provided with a longitudinal wire opening disposed eccentric to its axis and the axis of the said disks when the disks and member are interlocked, means for feeding a stay wire through the member, means for reciprocating the member between the disks, and means for rotating the said member and disk when the same are interlocked.

6. A wire fence machine, comprising a bed frame, a frame pivotally attached to said bed frame, a series of disks mounted in said frame provided with a wire opening, and formed with a laterally projected lug, a coiling member reciprocally mounted on the bed adapted to successively engage and have a locking relation with the disks, means for feeding strand wires through said disks, a stay wire adapted to be fed through the said member and by it coiled around the adjacent strands, means for moving the member, means for rotating the same when the coilers and disks are interlocked, and a traveler adapted to move adjacent to the faces of the disks and beneath their lugs for retaining the same in the position left by the coiler when the latter moves away therefrom, the said traveler actuated by the coiling member, substantially as specified.

7. A wire fence machine, comprising a bed frame, a frame pivotally attached to said bed, a guide attached to said pivoted frame and a series of disks mounted in said guide, a carrier, a coiling member revolubly mounted on said carrier, an overlying bearing for the disks attached to the guide aforesaid, means for interlocking the member and disks when coincident, means for feeding wire strands through the said disks, a stay forming wire fed through the said member adapted by the member to be coiled around the strands, means for actuating the said member, and a lever for shifting the pivoted frame to facilitate in the removal of the member, substantially for the purposes specified.

8. In a wire fence machine, a frame, a disk mounted in the frame having a central wire opening and a slot in the body thereof to one side of the opening and a portion of the slot extending through the body of the disk, means for feeding a strand wire through the opening in the disk, a coiling member having a wire opening eccentric to its axis and passing longitudinally through the member, the end of the said member adapted to enter the slot in the body of the disk to facilitate in coiling the wire passing the member and slot in the disk, around the strand wire aforesaid, and means for actuating said member.

9. In a machine of the class described, a coiling member having a spindle provided with a longitudinal opening, and an elongated barrel at the rear of the spindle adapted to contain a coil of wire, the forward end of the spindle provided with a slotted head and a forwardly projecting lug from said head, the opening in the spindle extending through the lug and disposed eccentric to the axis of said spindle, a pinion attached to the body of the spindle to the rear of the head, and the rear end of the barrel grooved, substantially for the purposes specified.

10. In a machine of the class described, a coiling member provided with a spindle having a wire opening therein, and a coil containing member attached to said spindle, the spindle having a head and a forwardly extended lug, in combination with a disk having a central wire opening and a slot corresponding to the lug of the spindle, to effect an interlocking relation of the head of the spindle and the said disk, substantially as specified.

11. In a machine of the class described, a twister disk comprising a member provided with an annular channel, and having a centrally disposed wire opening, and a laterally extended lug from the face of the member, all substantially as specified.

12. In a machine of the class described, a twister disk having a central wire opening and provided with an annular groove, the body of the member slotted for the purposes specified, and having a lug extension provided with a wire opening forming an extension of the opening in the body of the disk, substantially as specified.

13. In a machine of the class described, the combination with a frame, of a guide formed of two opposing plates, their matching faces at intervals having approximately semi-circular portions forming open ways upon opposite sides thereof, alternately disposed in different planes, twister disks having grooved portions corresponding to the semi-circular faces of the plates which form bearings for the said disks, and the said disks provided with a wire opening, and a slot adapted to alternately coincide with the open ways upon opposite sides of the disks, substantially as specified.

14. In a machine of the class described, the combination with a frame, a guide formed of two opposing plates, their matching edges at intervals having approximately semi-circular portions, and open ways intermediate the same alternately disposed in different planes, twister disks revolubly carried between the plates having a wire opening and provided with a slot adapted to alternately coincide with the open ways upon the opposite sides of the disks, and a coiling member provided with a head having a portion thereof adapted to coincide with the slots of the disks and movable in the open ways between the plates, substantially as specified.

15. In a machine of the class described, a frame, a series of disks revolubly supported in the frame, each having a central wire opening and a slot, the frame provided with longitudinal grooves between the disks disposed alternately in opposite planes, with which the slots in the disks coincide alternately, a coiling member provided with a head portion movable in the grooves of the frame and adapted to have an interlocking relation with the slots of the disks, a traveler controlled by the movement of the coiling member for normally holding the disks with their slots matching one of the grooves of the frame, and a lubricating wick supported by the frame adapted to engage a portion of the member in its movement, substantially as specified.

16. A wire fence machine, comprising a bed, a carriage reciprocally mounted on said bed, coiling devices revolubly supported on said carriage, a driving shaft, a spiral screw feed, gearing between the carriage and screw, the same also controlling the movement of the coiling member, gearing for actuating the said driving shaft, connections between the drive shaft and screw, clutch mechanism in said gearing, and means carried by the carriage adapted to automatically actuate the clutch parts aforesaid and thereby reverse the action of the drive shaft and also the screw, substantially for the purposes specified.

17. A wire fence machine, comprising a bed, a carriage reciprocally mounted on said bed, coiling devices supported by said carriage, a spiral screw feed, connections between carriage and screw for driving said carriage at stated intervals, connections between the said screw and coiling devices for rotating the latter upon the stopping of the carriage, a drive for the said screw, and means carried by the carriage for automatically controlling the reversing of the said drive and screw, substantially for the purposes specified.

18. A wire fence machine, comprising a bed, a carriage reciprocally mounted on said bed, a spiral screw journaled on said bed, means for driving the said screw, and means for reversing the direction of rotation of said screw, a shaft journaled on the said carriage, a spiral gear coacting with said screw, a coiling member revolubly mounted on the carriage, gearing on one end of the carriage shaft having suitable connection with the coiling member for rotating the same, means for locking the carriage shaft and its gearing when the carriage is shifted, and means for releasing the shaft and gearing when the carriage is stopped to facilitate in actuating the coiling member through the screw and gearing aforesaid, substantially as specified.

19. A wire fence machine, comprising a bed, a carriage reciprocally mounted on said bed, a longitudinally disposed screw feed, means for actuating said screw and means for reversing its movement at stated intervals, a coiling member revolubly mounted on the carriage, a shaft journaled on said carriage, a gear on the said shaft adapted to be rotated by the screw and intermittingly and alternately caused to travel along the screw for moving the carriage, and gearing interposed between the carriage shaft and coiling member adapted to be actuated for rotating the said coiling member, substantially as specified.

20. A wire fence machine, comprising a bed, a carriage reciprocally mounted on said bed frame, a screw feed, means for actuating said feed, a carriage shaft, a gear on the said shaft adapted to be alternately rotated by the said screw and caused to travel on the screw, a member on said carriage shaft, locking means also carried by the said carriage adapted to engage means on the bed for retaining the carriage momentarily in a fixed position, and the said locking means adapted to be automatically released to permit the carriage to move, substantially as specified.

21. In a wire fence machine, the combination with a bed, a carriage reciprocally supported on said bed, a screw feed, driving connections between the said feed and carriage, a driving shaft, driving connections between the said shaft and screw, gearing for actuating the said driving shaft, and means on the carriage adapted to reverse the position of the gearing and thereby reverse the action of the shaft, the feed and carriage, substantially as specified.

22. In a wire fence machine, the combination with a bed, a carriage reciprocally supported on said bed, a screw feed, driving connections between the said feed and carriage for moving the carriage from one end of the bed to the other, a driving shaft, driving connections between the said shaft and screw, means for locking the screw against rotation when the carriage reaches the end of the bed in either direction, and means for reversing the rotation of the driving shaft and screw upon the carriage reaching the end of the bed, substantially as specified.

23. In a wire fence machine, the combination with a bed, a carriage reciprocally mounted on said bed, a screw feed, gearing supported by the carriage having connection with said screw, a driving shaft, means for actuating the same, driving connections between said shaft and screw, a traveler attached to the carriage and movable on the driving shaft, the same adapted when the carriage reaches the end of the movement to automatically engage means for reversing the movement of the said shaft and thereby the carriage, and locking means for the screw to facilitate in holding the said screw during the reversal of the driving shaft, substantially as specified.

24. In a wire fence machine, the combination with a bed, a carriage reciprocally mounted on said bed, a shaft journaled on said carriage, driving connections with said carriage shaft, a disk on the said shaft having oppositely placed teeth, a bar on the bed having lugs with which the teeth of the disk engage, a second bar on the bed provided with a series of lugs, two yieldingly held locking pawls adapted to coact with the teeth of the disk and the teeth of the last mentioned bar, the same adapted to lock in position the shaft through the disk and when coinciding with the teeth of the last mentioned bar adapted to be raised to permit a partial rotation of the said disk and its shaft, substantially as specified.

25. In a wire fence machine, the combination of a bed, a reciprocally supported carriage on said bed, a shaft journaled on said carriage, a screw feed, gearing between the feed and carriage shaft, means for locking the shaft at intervals to effect the moving of the carriage, means for stopping the carriage at intervals to effect the actuation of the carriage shaft, devices for locking the carriage as it reaches the end of the bed, and retaining the same for a predetermined period during the interval of which the carriage shaft is rotated, means for locking the screw momentarily, and means operating synchronously with the locking of the screw to reverse the rotation of the driving shaft, substantially as specified.

In testimony whereof we affix our signatures, in presence of two witnesses.

JOSEPH W. SOMMER.
PETER W. SOMMER.
WILLIAM H. SOMMER.

Witnesses for Joseph W. and Peter W. Sommer:
  B. L. SOMMER,
  PETER SOMMER.

Witnesses for William H. Sommer:
  JESSE STEPHENSON,
  WM. E. GETZ.